United States Patent Office 2,999,874
Patented Sept. 12, 1961

2,999,874
ESTERS OF PHOSPHORIC AND THIOPHOSPHORIC ACIDS CONTAINING SULFOXIDE GROUPS AND PROCESS FOR THEIR PRODUCTION

Gerhard Schrader, Wuppertal-Cronenberg, Germany, assignor to Farbenfabriken Bayer Aktiengesellschaft, Leverkusen, Germany, a corporation of Germany
No Drawing. Filed Oct. 23, 1957, Ser. No. 691,807
Claims priority, application Germany Dec. 1, 1956
5 Claims. (Cl. 260—461)

The present invention relates to thiophosphoric acid esters and their production. Generally the compounds of the present invention may be represented by the following formula

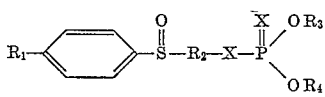

wherein $R_1$ denotes an alkyl, especially a lower alkyl radical or a halogen atom, $R_2$ an alkylene, especially a lower alkylene radical, X denotes an oxygen or a sulfur atom, at least one X being sulfur or a direct linkage between the radical $R_2$ and the phosphorus atom, and $R_3$ and $R_4$ stand for lower alkyl radicals.

Thiophosphoric acid esters have become more and more important in the field of insecticides, acaricides, miticides etc. during the last years. Thus, it is the principal object of the present invention to provide a new class of phosphoric acid esters, suitable as pesticides or as intermediates for the production of other pesticides. Another object is the preparation of these phosphoric acid esters; still further objects will become apparent as the following description proceeds.

The compounds of the present invention may be obtained by oxidizing the corresponding sulfide group containing esters of the following formula

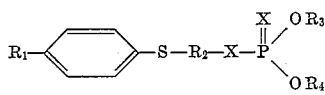

in which the symbols have the same significance as described above. An especially suitable oxidizing agent is hydrogen peroxide. The reaction generally should be carried out at slightly elevated temperatures say up to about 50° C. in the presence of suitable inert water-misicible solvents. Especially suitable are lower aliphatic carboxylic acids, such as acetic acid.

The compounds of the present invention are generally valuable insecticides and plant-protecting agents. They kill pests such as aphids, flies and mites and exhibit a very remarkable systemic action. The specially remarkable action of the compound of the present invention is the effect against spider mites. The application of these compounds should be carried out according to the use of other known phosphor insecticides, i.e. in dilution or solution with solid or liquid carriers such as chalk, talc, bentonite, water, alcohols, liquid hydrocarbons, etc. The inventive compounds may further be used in combination with other known insecticides or pesticides, etc. Effective concentrations of the compounds may vary also; generally concentrations of 0.0001% to 1.0% kill pests effectively. The combinations of the compounds may be sprayed or dusted or otherwise brought in contact with pests or plants to be protected. They may also be used as aerosols.

As an example for the special utility the compound of the following formula

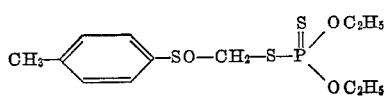

has been tested against spider mites on nasturtium plants. Plants have been sprayed drip wet with an aqueous emulsion containing 0.01% of active ingredient, and spider mites were killed completely after 24 hours. The aqueous emulsions used in this test have been prepared by dissolving the above shown compound in the same amount of dimethyl formamide adding thereto 20% its weight of active ingredient of a benzyl diphenyl polyglycol ether (commercial emulsifier) and diluting this premixture with water to the above said concentration. The following examples may illustrate this invention without limiting it thereto.

Example 1;

66 grams of the compounds having the formula

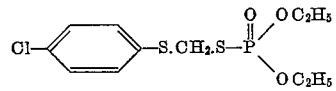

are dissolved in 100 millilitres of glacial acetic acid to which 1 millilitre of 50 percent sulphuric acid is added. 27 millilitres of 38 percent hydrogen peroxide are added thereto at 40° C. Due to the reaction heat, the temperature remains at 40° C. for about a further half hour. The mixture is heated to 40° C. for another hour, until the hydrogen peroxide is completely used up. The reaction mixture is then poured into 200 millilitres of ice-water, the separated oil is taken up in 150 millilitres of benzene, the benzene solution is washed with water and dried with sodium sulphate. After distillation of the benzene, 57 grams of the new sulphoxide of the formula

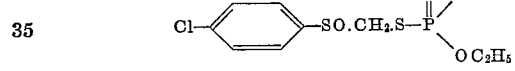

are obtained as a colourless viscous oil which cannot be distilled without decomposition even under high vacuum.
*Analysis.*—Calculated for molecular weight 342: $S=18.6\%$; $P=9.6\%$; $Cl=10.3\%$. Found: $S=18.7\%$; $P=8.2\%$; $Cl=11.3\%$.

Example 2

62 grams of the compound having the formula

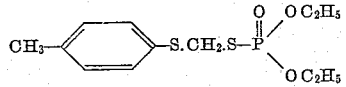

are dissolved in 100 millilitres of glacial acetic acid. 1 millilitre of 50 percent sulphuric acid is added thereto and the mixture is oxidized at 40° C. with 28 millilitres of 38 percent hydrogen peroxide. The product is worked up as described in Example 1, and 54 grams of a compound of the formula

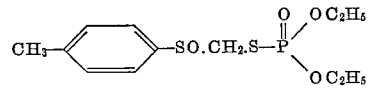

are thus obtained as a pale yellow viscous water-insoluble oil which cannot be distilled even under high vacuum.
*Analysis.*—Calculated for molecular weight 322; $S=19.8\%$; $P=9.9\%$. Found: $S=19.7\%$; $P=9.1\%$.

Example 3

68 grams of the compound having the formula

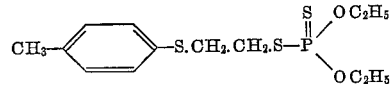

are dissolved in 100 millilitres of glacial acetic acid. 1 millilitre of 50 percent sulphuric acid is added thereto and the mixture is oxidized at 40° C. with 27.5 millilitres of 38 percent hydrogen peroxide. After usual working up, 61 grams of the new sulphoxide of the formula

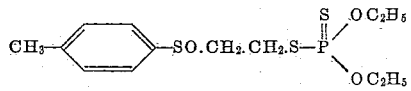

are obtained as a pale yellow oil which cannot be distilled even under high vacuum.

*Analysis.*—Calculated for molecular weight 352: S=28.2%; P=8.6%. Found: S=27.4%; P=8.7%.

At a concentration of 0.1 percent the product kills spider mites completely.

Example 4

58 grams of the compound having the formula

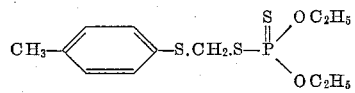

are dissolved in 100 millilitres of glacial acetic acid. 1 millilitre of 50 percent sulphuric acid is added thereto and the mixture is oxidized at 40° C. with 27 millilitres of 38 percent hydrogen peroxide. After usual working up, 59 grams of a compound having the formula

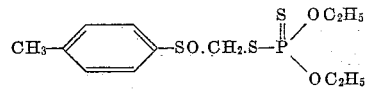

are obtained as a pale yellow oil which cannot be distilled, even under high vacuum.

*Analysis.*—Calculated for molecular weight 338: S=28.4%; P=9.1%. Found: S=28.3%; P=8.9%.

At a concentration of 0.01 percent the product kills spider mites completely.

It has to be understood, however, that using other phosphoric acid esters, such as the methyl-, n-propyl-, isopropyl-esters, compounds of analogous structure are obtained, which exhibit the same insecticidal activity. The alkylene chain between the SO-group and the phosphorus acid radical may be also an n-propylene-, isopropylene-, methyl-methylene-chain, and the like, thus also yielding esters with good insecticidal activities. At last also the benzene nucleus may carry other substituents such as the bromine atom, an ethyl- or another lower alkyl-group, such as the ethyl-, propyl- or butyl-group. Using the reaction conditions shown in the above examples, but only using the corresponding different molecular amounts, compounds of the before shown type are obtained, which also exhibit the desired insecticidal activity.

I claim:

1. Thiophosphoric acid esters of the following formula

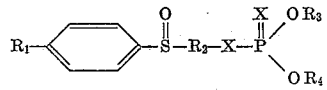

wherein $R_1$ stands for a member selected from the group consisting of a lower alkyl radical and a halogen atom, $R_2$ stands for a lower alkylene radical, X stands for a member selected from the group consisting of an oxygen and a sulfur atom, at least one X being sulfur, and $R_3$ and $R_4$ stand for lower alkyl radicals.

2. A thiophosphoric acid ester of the following formula:

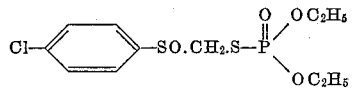

3. A thiophosphoric acid ester of the following formula:

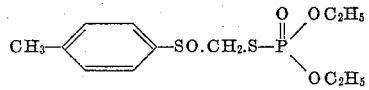

4. A thiophosphoric acid ester of the following formula:

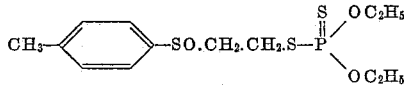

5. A thiophosphoric acid ester of the following formula:

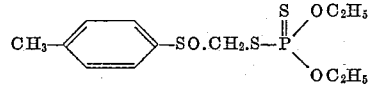

References Cited in the file of this patent

UNITED STATES PATENTS

| | | |
|---|---|---|
| 2,679,508 | Gysin | May 25, 1954 |
| 2,767,194 | Fancher | Oct. 16, 1956 |
| 2,791,599 | Lane et al. | May 7, 1957 |
| 2,793,224 | Fancher | May 21, 1957 |

FOREIGN PATENTS

| | | |
|---|---|---|
| F 16085 | Germany | Feb. 23, 1956 |

OTHER REFERENCES

Fukoto et al.: "J. Econ. Entomol.," 48, 347–354 (August 1955).